(12) United States Patent
Katayama (10) Patent No.: US 6,199,516 B1
(45) Date of Patent: Mar. 13, 2001

(54) COOLING APPARATUS FOR INTERNAL COMBUSTION ENGINE

(75) Inventor: Takashi Katayama, Hamamatsu (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 0 days.

(21) Appl. No.: 09/199,558

(22) Filed: Nov. 25, 1998

(30) Foreign Application Priority Data

Nov. 28, 1997 (JP) ..................................................... 9-327890

(51) Int. Cl.⁷ ......................................................... F01P 7/16
(52) U.S. Cl. ...................................... 123/41.1; 123/195 R
(58) Field of Search ............................. 123/41.1, 195 R, 123/195 C (56) References Cited

U.S. PATENT DOCUMENTS

| | | | |
|---|---|---|---|
| 5,476,077 | * 12/1995 | Nishio | 123/195 R |
| 5,503,117 | * 4/1996 | Saito | 123/41.44 |
| 5,647,315 | * 7/1997 | Saito | 123/196 AB |
| 5,809,963 | * 9/1998 | Saito | 123/195 C |

\* cited by examiner

Primary Examiner—Marguerite McMahon
Assistant Examiner—Jason Benton
(74) Attorney, Agent, or Firm—Nath & Associates; Gary M. Nath; Harold L. Novick (57) ABSTRACT

For the purpose for avoiding the generation of the air standing by making the mounting position of the thermo-case low, shortening the length of cooling water piping between the thermo-case and the radiator, and enhancing the cooling efficiency, the mounting bracket 20 for mounting the internal combustion engine 1 on the internal combustion engine body 2 is provided and on the mounting bracket 20 the thermo-case 9 installed in the thermostat 11 to be provided in the cooling water circuit is mounted in a unit. And, to the thermo-case 9 the cooling water pipings 8 and 10 interconnecting the radiator 7 and the water pump 3 are connected.

5 Claims, 13 Drawing Sheets

COOLING APPARATUS FOR INTERNAL COMBUSTION ENGINE

BACKGROUND OF THE INVENTION

1. Field of Invention

The present invention relates to a cooling apparatus for an internal combustion engine, in which a mounting bracket for mounting an internal combustion engine on a vehicle and a thermostat provided in a channel for cooling water are formed in a unit.

2. Background of Related Art

Figure 13:
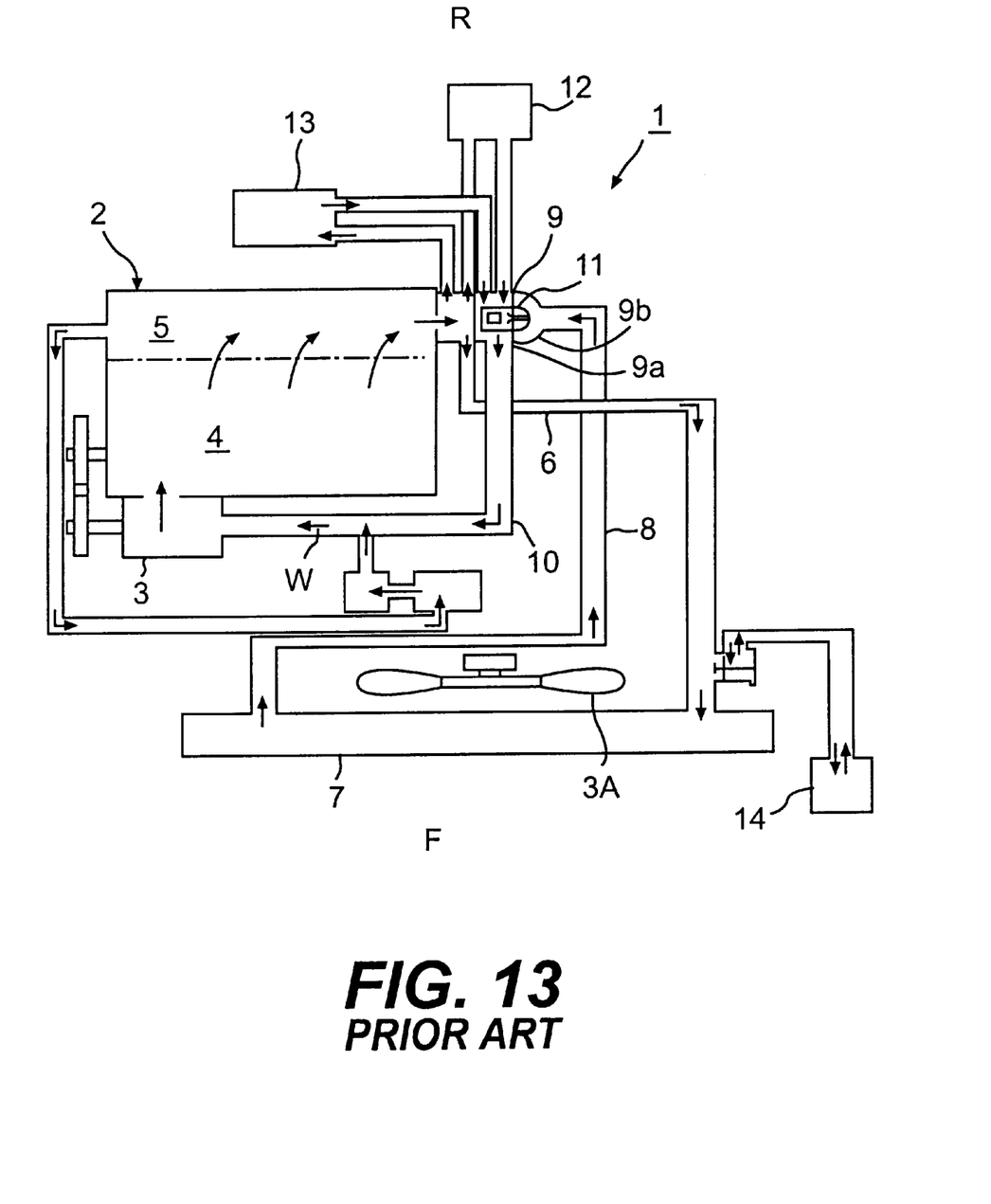
FIG. 13 is a schematic diagram showing a cooling system of a conventional cooling water type internal combustion engine.
Figure 14:
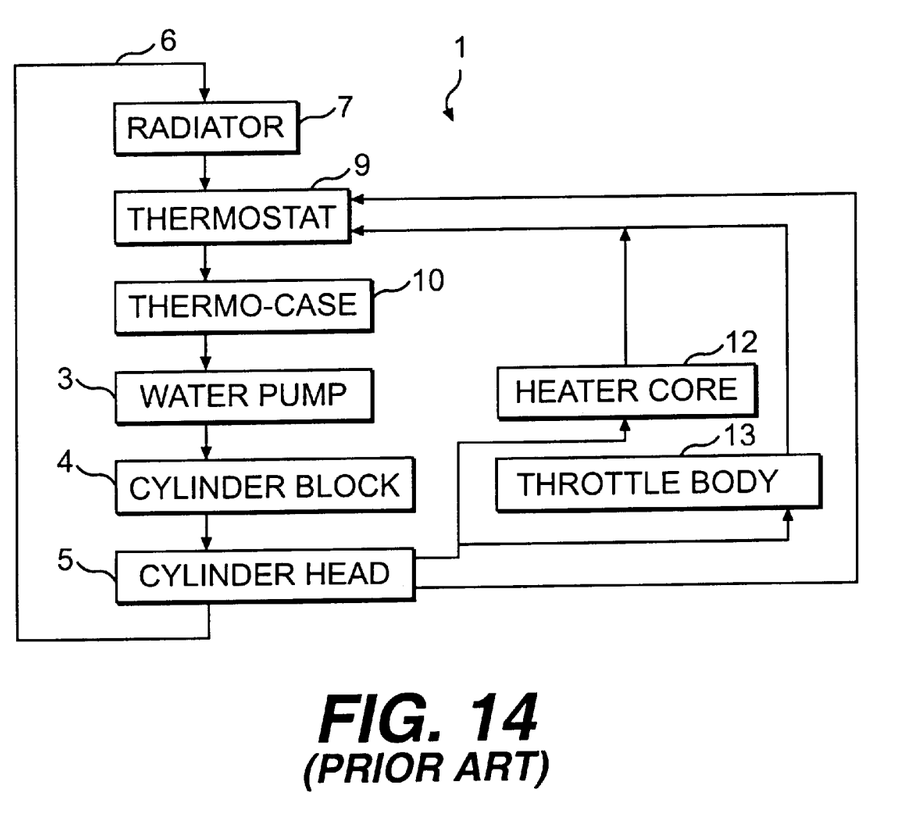
FIG. 14 is a systematic diagram of the cooling system of the cooling water type internal combustion engine.

Conventionally, a cooling water for vehicles is adapted to circulate between the internal combustion engine and a radiator to cool a cylinder block and the like in order to keep a temperature of the cylinder block or a cylinder head at a constant one or control the temperature in order to avoid a seizure. FIG. 13 is a schematic diagram showing the cooling system for a water cooling type internal combustion engine, and FIG. 14 shows a systematic drawing for this water cooling system. In FIG. 13, sign 1 shows an internal combustion engine and sign 2 shows internal combustion engine body.

In the internal combustion engine body 2, a water cooling channel (not shown) is provided and this water channel is provided with a water pump 3 which is mounted on the front side of the vehicle and driven by a V-belt as well as a cooling fan 3A. This cooling water channel is composed of basically a main channel and a by-pass channel. In the main channel, the cooling water discharged from the water pump 3 flows from the cylinder block 4 to the cylinder head 5 through a cooling water piping 6, and from an upper tank (not shown) to the radiator 7, and from a lower tank (not shown) through a cooling water piping 8 to a thermo-case 9, and through a cooling water piping 10, it returns again to the water pump 3.

Further, the by-pass channel is a channel which circulates to the water pump 3 from the cylinder head 5 without passing through the radiator 7 when the thermostat 11 is closed. The thermostat 11 closes the valve when the temperature of the cooling water is low to stop a flowing of the cooling water to radiator 7 and make the warming time period shorten by circulating the cooling water through the by-pass channel.

Figure 15:
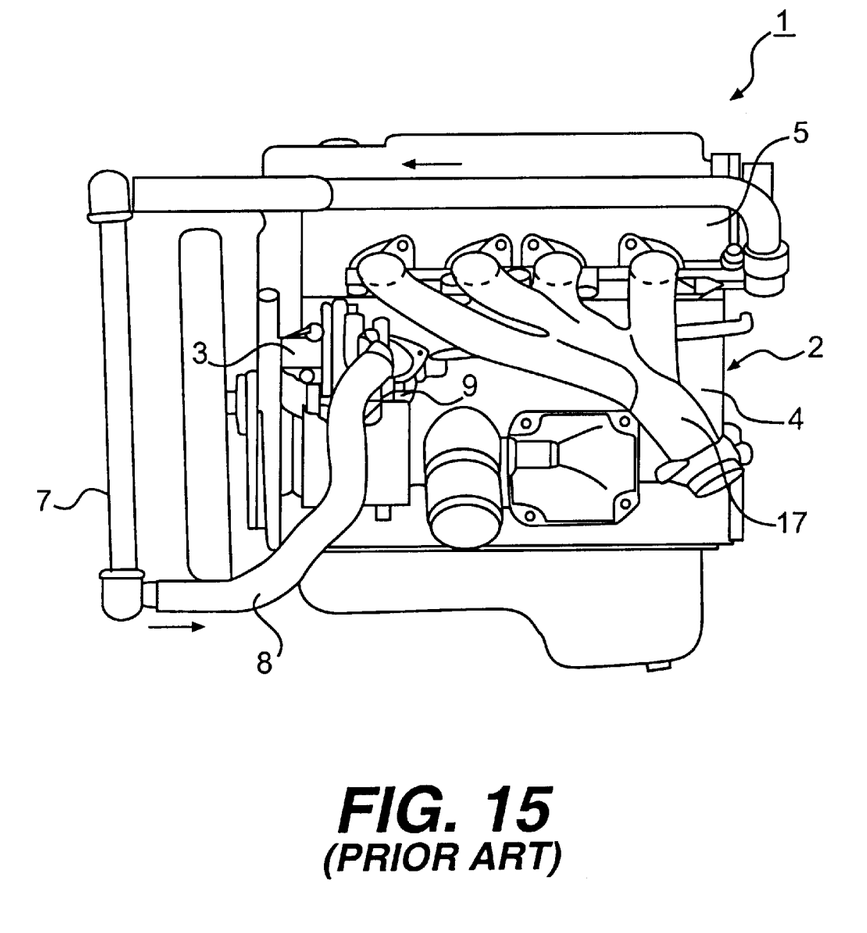
FIG. 15 is a side view of a portion of a conventional cooling apparatus of the internal combustion engine

In addition, channels such as circulating the cooling water from the cylinder head 5 through a heater core 12, the thermo-case 9 and the cooling water piping 10 to the water pump 3, and circulating the cooling water from the cylinder head 5 through a throttle body 13, the thermo-case 9 and the cooling water piping 10 to the water pump 3 are provided. Now, in FIG. 13, the sign 14 represents a water reservoir tank, and sign W and arrows represent flowing directions of the cooling water. In FIG. 15, the sign 17 represents an exhaust manifold.

The thermo-case 9 is what installs a thermostat 11, which is formed with a case body 9a and a thermo-cap 9b. This thermo-case 9 is mounted on the cylinder head 5 which is disposed at the rear side of a lengthwise-setting internal combustion engine, a crank shaft of which is disposed in parallel with a back-and-forth direction of a vehicle (hereinafter, such engine is referred to as lengthwise-setting internal combustion engine, and an engine in which a crank shaft is disposed normally to the back-and-forth direction horizontally is referred to as crosswise-setting internal combustion engine) and higher than the cylinder block 4 (the schematic diagram of FIG. 13 is what helps understandings of the circulation of the cooling water, and actually, the thermo-case 9 is mounted on the cylinder head 5 disposed above the cylinder block 4).

Further, FIG. 15 shows a cooling apparatus in which the thermo-case 9 is disposed at a substantially intermediate position of the lengthwise-setting internal combustion engine 1 in the back-and-forth direction of the vehicle, and mounted on the cylinder block 4 positioned lower than the cylinder head 5. Further, a cooling water piping 8 connecting this thermo-case 9 and the lower tank of the radiator 7 is disposed close to the internal combustion engine body 2. Now, in FIG. 15, the identical members in FIG. 13 are attached with the same signs and their explanations are omitted.

In the conventional prior art explained above, in what is shown in FIG. 13, since the thermo-case 9 is mounted on the cylinder head 5 of the internal combustion engine 1, the mounting position of the thermostat 11 becomes higher, and the thermo-case 9 is mounted at the rear side of the lengthwise-setting internal combustion engine 1, there arises a problem that the cooling water piping connecting the thermo-case 9 and the lower tank of the radiator becomes longer.

At that state, when the cooling water is filled in the radiator 7, since the thermo-case 9 is located at a higher position and the thermostat 11 is closed, there arises a problem that, in the cooling water piping 8, a standing air is apt to be generated. If such a standing air is generated, there arises a problem which causes the cooling water to be reduced and to invite a deterioration of the internal combustion engine (for example, seizure).

Further, FIG. 15 shows a cooling apparatus in which the thermo-case 9 is disposed on a substantially intermediate position of the lengthwise-setting internal combustion engine 1 in the back-and-forth direction, and mounted on the cylinder block. By this construction, there has been also arisen a problem that the mounting position of the thermo-case 9 becomes high and the cooling water piping 8 which connects the lower tank and of the radiator 7 and the thermo-case 9 becomes long.

Further, there are also problems in which the cylinder block 4 needs a space for mounting the thermo-case 9 or a boss for tightening the thermo-case 9. In addition, since the cooling water piping 8 is disposed close to the internal combustion engine body 2, there is a problem that the cooling water pipings 8 and 10 receive the heat of the internal combustion engine body 2 and the cooling efficiency is decreased.

SUMMARY OF THE INVENTION

The present invention is to solve the above conventional problem, and the purpose thereof is to provide a cooling apparatus of an internal combustion engine, in which the thermo-case is mounted in a unit with a mounting bracket of an internal combustion engine, thereby the mounting position of the thermo-case becomes lower to avoid an air standing, the internal combustion engine from being deteriorated when the cooling water is reduced, the length of the cooling water piping between the thermo-case and a radiator, and the length of a cooling water piping between the thermo-case and a water pump are made short, in addition the provision of a mounting space for the thermo-case and a boss for clamping the thermostat on a cylinder block is adapted to be unnecessary and the cooling efficiency is improved.

According to the first feature of the present invention, in a cooling apparatus which is provided with a cooling water circuit connecting a cooling water channel provided in an internal combustion engine body and a radiator to cool the water heated in the internal combustion engine body with a cooling water piping and a water pump for circulating a cooling water in the cooling water circuit, a mounting bracket for mounting the internal combustion engine on a vehicle is provided in the internal combustion engine body and a thermo-case in which a thermostat provided in the cooling water circuit is installed is provided in a unit with the mounting bracket.

Further, according to the second feature of the present invention, in the first feature of the present invention, the thermo-case is mounted on the internal combustion engine in such a manner as an angle which is formed with a center line of the thermostat provided coaxially with the thermo-case and a horizontal axis of the internal combustion engine in the axial direction becomes greater than the angle which is formed with a horizontal axis in the axial direction when the internal combustion engine is mounted on a vehicle and a horizontal axis in the axial direction of the internal combustion engine itself.

Further, according to the third feature of the present invention, in the above features, the cooling water piping connecting the radiator and the thermo-case and the cooling water piping connecting the thermo-case and the water pump are disposed apart from the internal combustion engine.

Further, according to the fourth feature of the present invention, in the above features, the cooling water piping connecting the radiator and the thermo-case and the cooling water piping connecting the thermo-case and the water pump are disposed at the side opposite to the side where an exhaust manifold provided in the internal combustion engine is disposed.

DETAILED DESCRIPTION OF PREFERRED EMBODIMENTS

Figure 1:
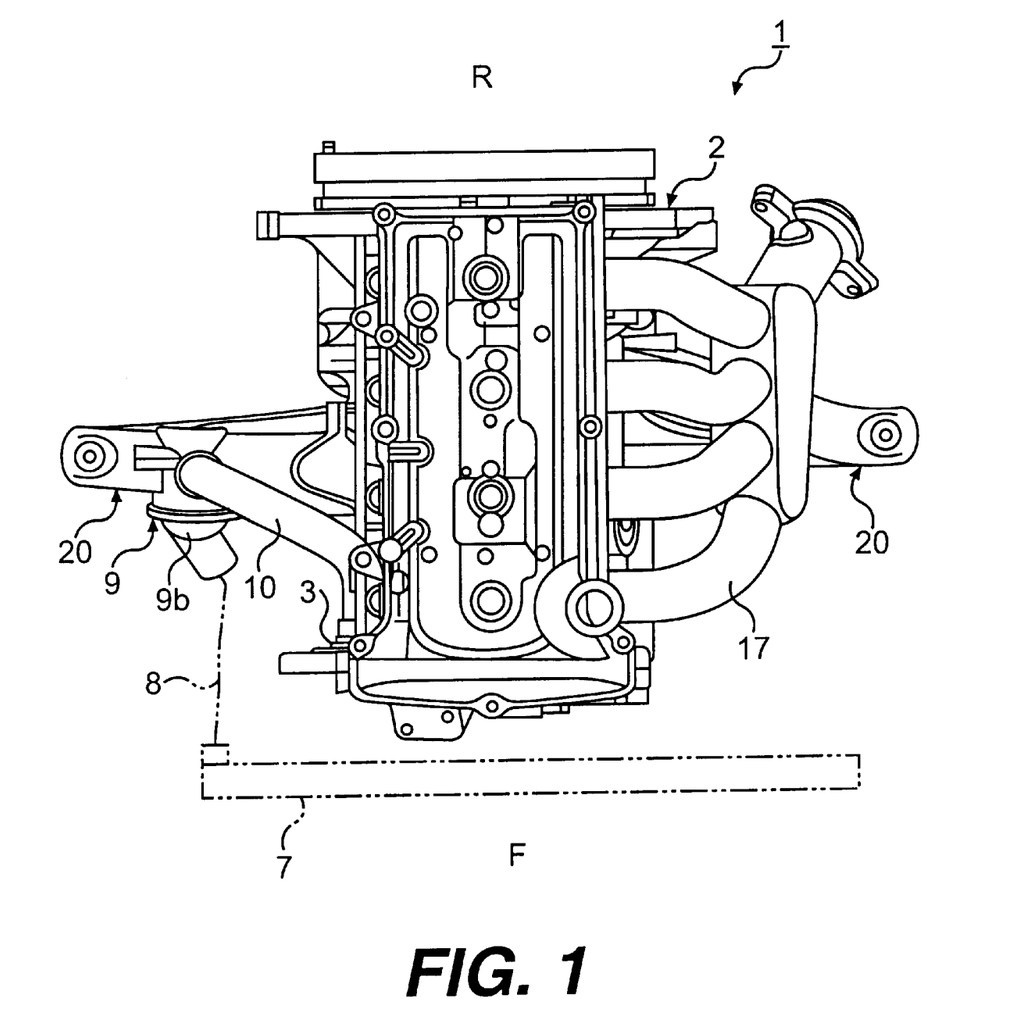
FIG. 1 is an plan view of the embodiment of the present invention.
Figure 2:
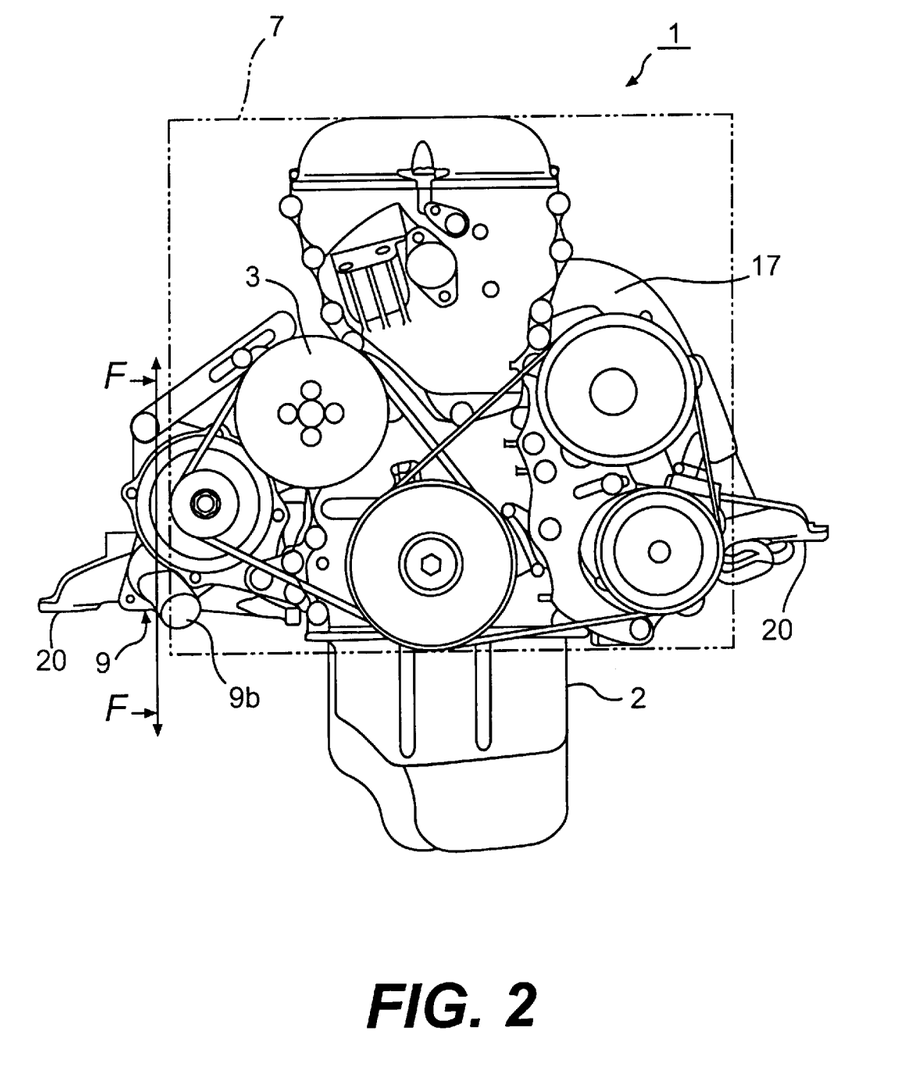
FIG. 2 is a front view of what is shown in FIG. 1.

Hereinafter, an embodiment of the present invention is explained based on FIGS. 1–3, as to the identical members to the ones shown through FIGS. 13–15, the identical signs are attached. In Figs., the sign 1 represents a lengthwise-setting internal combustion engine, the sign 2 represents its body. At the bottom of the internal combustion engine body 2, a pair of mounting brackets 20 for mounting the internal combustion engine 1 on the vehicle are provided at its bottom left and right. The sign F shows a front side of the vehicle and R shows a rear side thereof.

In the mounting bracket 20, a thermo-case. 9 (see FIG. 4) in which a thermostat 11 provided in the cooling water circuit and to close a cooling water channel to a radiator 7 while the engine being warmed and open the channel when the temperature of the cooling water reaches a given one is installed is provided in a unit. This thermo-case 9 comprises a case body 9a and thermo-cap 9b, which is mounted on the mounting bracket 20 in such a manner as the thermo-cap 9b is directed toward the front side of the vehicle and the case body 9a is directed toward the rear side of the vehicle. And the thermostat 11 is installed in the thermo-case 9 coaxially.

Figure 4:
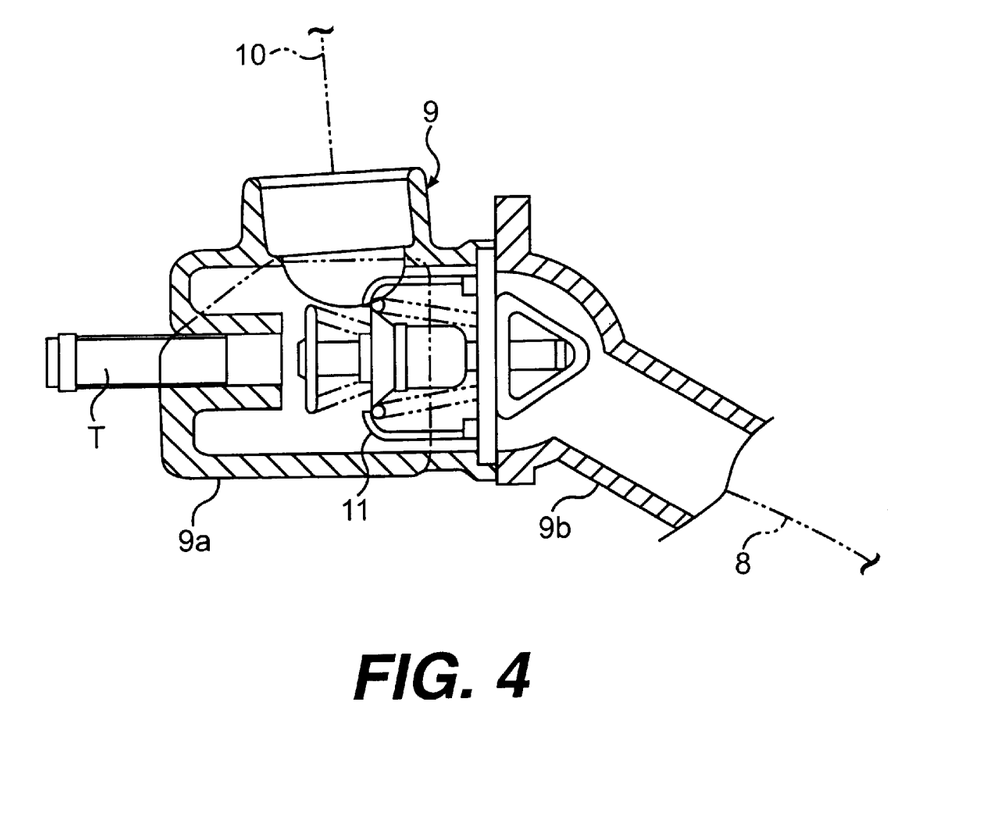
FIG. 4 is a sectional view along with F—F line of FIG. 2.

And, the case body 9a of the thermo-case 9 is communicated with a water pump 3 to be driven by a V-belt (not shown) provided at the front side of the internal combustion engine body 2 through a cooling water piping 10. Further, the thermo-cap 9b of the thermo-case 9 is communicated with a lower tank (not shown) of the radiator 7 through a cooling water piping 8.

In addition, an upper tank (not shown) of the radiator 7 and a cooling water channel of the internal combustion engine body 2 are communicated with each other through a cooling water piping 6 (see FIG. 13). Thereby, the internal combustion engine 1 is provided with a circuit (main) in which the cooling water after being cooled by the radiator flows into the water pump 3 through the thermo-case 9, and from the water pump 3, it circulates through internal combustion engine body 2 to the radiator 7, and a circuit (by-pass) in which the cooling water does not pass through the radiator 7.

As mentioned above, since the thermo-case 9 is provided on the mounting bracket 20 in a unit, the mounting position of the thermo-case 9 can be made lower than that of the conventional one and also can shorten the length of the cooling water piping 8 connecting the lower tank of the radiator 7 and the thermo-case 9 and the length of cooling water piping 10 connecting the thermo-case 9 and the water pump 3 respectively. Further, the cooling water pipings 8 and 10 can be disposed apart from the internal combustion engine body 2 and at the side opposite to the side of the internal combustion engine 1 where an exhaust manifold 17 is provided.

Figure 3:
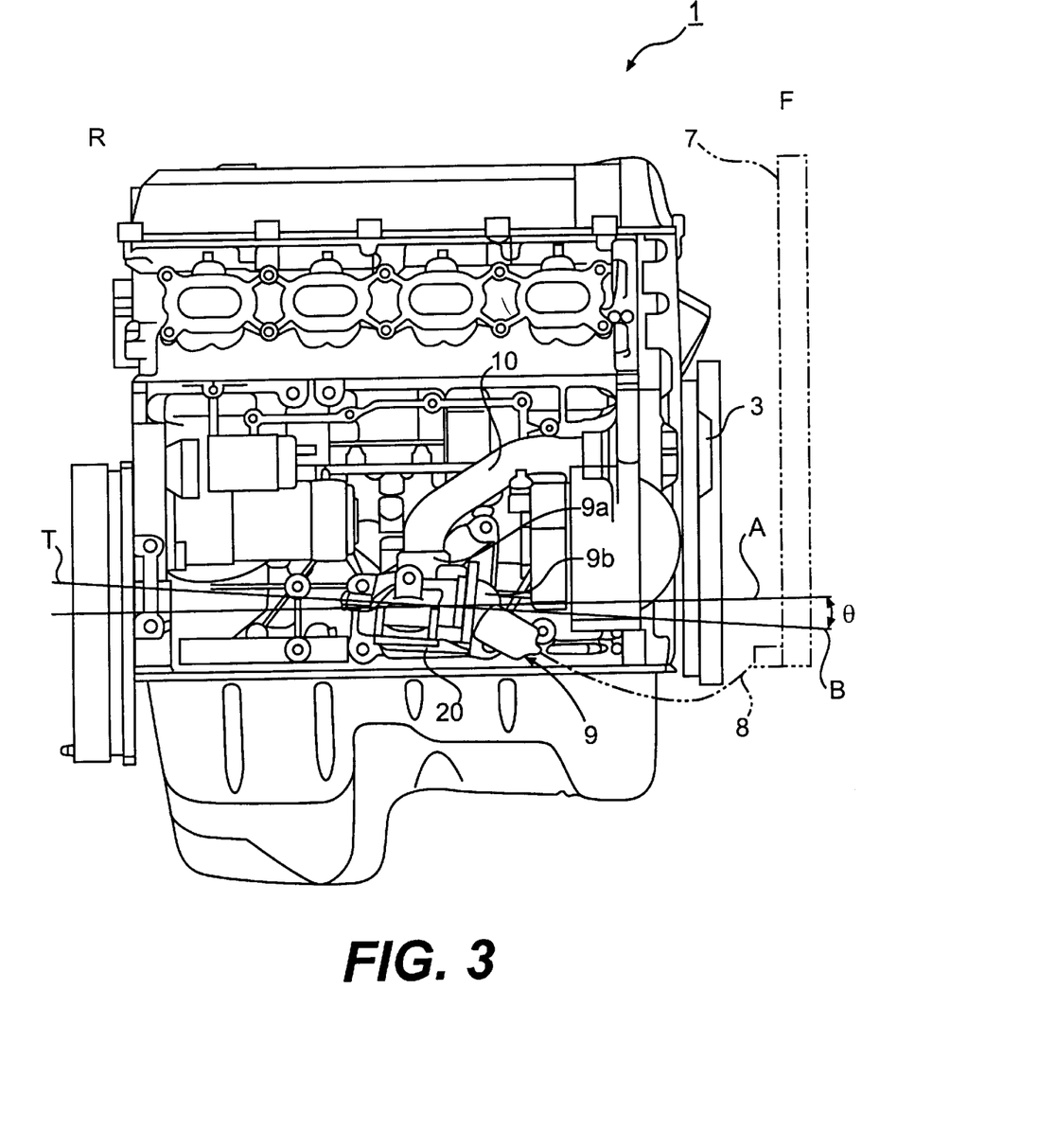
FIG. 3 is a left side view of what is shown in FIG. 1.

As shown in FIG. 3, an angle which is formed with a center line T of the thermostat 11 provided in the thermo-case 9 coaxially and a horizontal axis A in the axial direction of the internal combustion engine itself is made greater than the angle θ which is made with the horizontal axis B in the axial direction of the internal combustion engine 1 when it is mounted on the vehicle and the horizontal axis A in the axial direction of the internal combustion engine 1 itself, and the thermostat 11 is adapted to be mounted on the mounting bracket 20 of the internal combustion engine 1.

Figure 5:
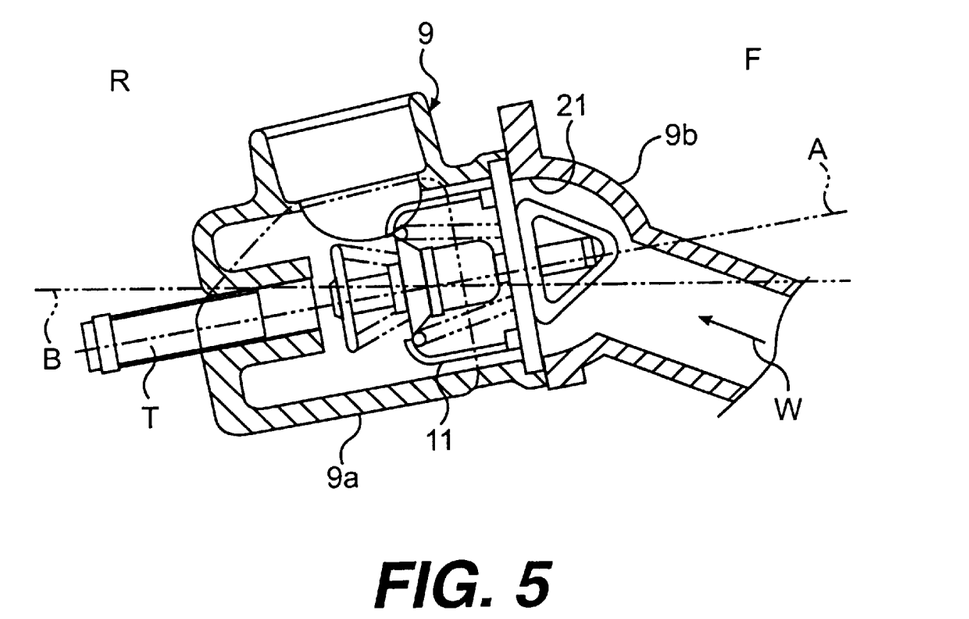
FIG. 5 is a sectional view of the thermo-case the center line of which is slanted relative to the horizontal axis B.

In this embodiment, as shown in FIG. 3, the angle which is formed with the center line T of the thermostat 11 and the horizontal axis A in the axial direction of the internal combustion engine 1 itself is made in coincidence with the angle θ which is formed with the horizontal axis B in the axial direction of the internal combustion engine 1 when it is mounted on the vehicle and the horizontal axis A in the axial direction of the internal combustion engine 1 itself, that is, by making the center line T of the thermo-case 9 in coincidence with the horizontal axis B, and the thermo-case 9 is mounted on the mounting bracket 20. Accordingly, the thermo-cap 9b side of the thermo-case 9 disposed at the front side F of the vehicle is located lower than the thermo-case body 9a side. FIG. 4 shows the thermostat 11 when the internal combustion engine 1 is mounted on the vehicle, the center line T of the thermostat 11 coaxially with the thermo-case 9 is adapted to be horizontal, so that the air standing is not generated As mentioned above, in the case where the angle formed with the center line T of the thermostat 11 and the horizontal axis A in the axial direction of the internal combustion engine itself is not made to be the angle θ which is formed with the horizontal axis B in the axial direction of the internal combustion engine 1 when it is mounted on the vehicle but to be 0, i.e., the center line T of the thermostat 11 is made in accordance with the horizontal axis A and the thermo-case 9 (thermostat 11) is mounted on the mounting bracket 20, and in such state the internal combustion engine 1 is mounted on the vehicle, as shown in FIG. 5, the center line T of the thermo-case 9 is inclined and the case body 9a is postured to be inclined toward the rear side R of the vehicle. That is, the flowing path in the case body 9a becomes downward more than the flowing path in the thermo-cap 9b. In case the cooling water flows in the state (in the flowing direction W), the air standing 21 is apt to be formed at the upper portion in the thermo-cap 9b.

In order to avoid an generation of the air standing, by making the angle which is formed with the center line T of the thermostat 11 and the horizontal axis A in the axial direction of the internal combustion engine itself greater than the angle θ which is formed with the horizontal axis A of the internal combustion engine itself and the horizontal axis B when the internal combustion engine is mounted on the vehicle, the thermo-case 9 is mounted on the mounting bracket 20. Thereby, when the internal combustion engine is mounted on the vehicle, since the thermo-cap 9b side is made lower than the thermo-cap body 9b side, the generation of such air standing is avoided.

Figure 6:
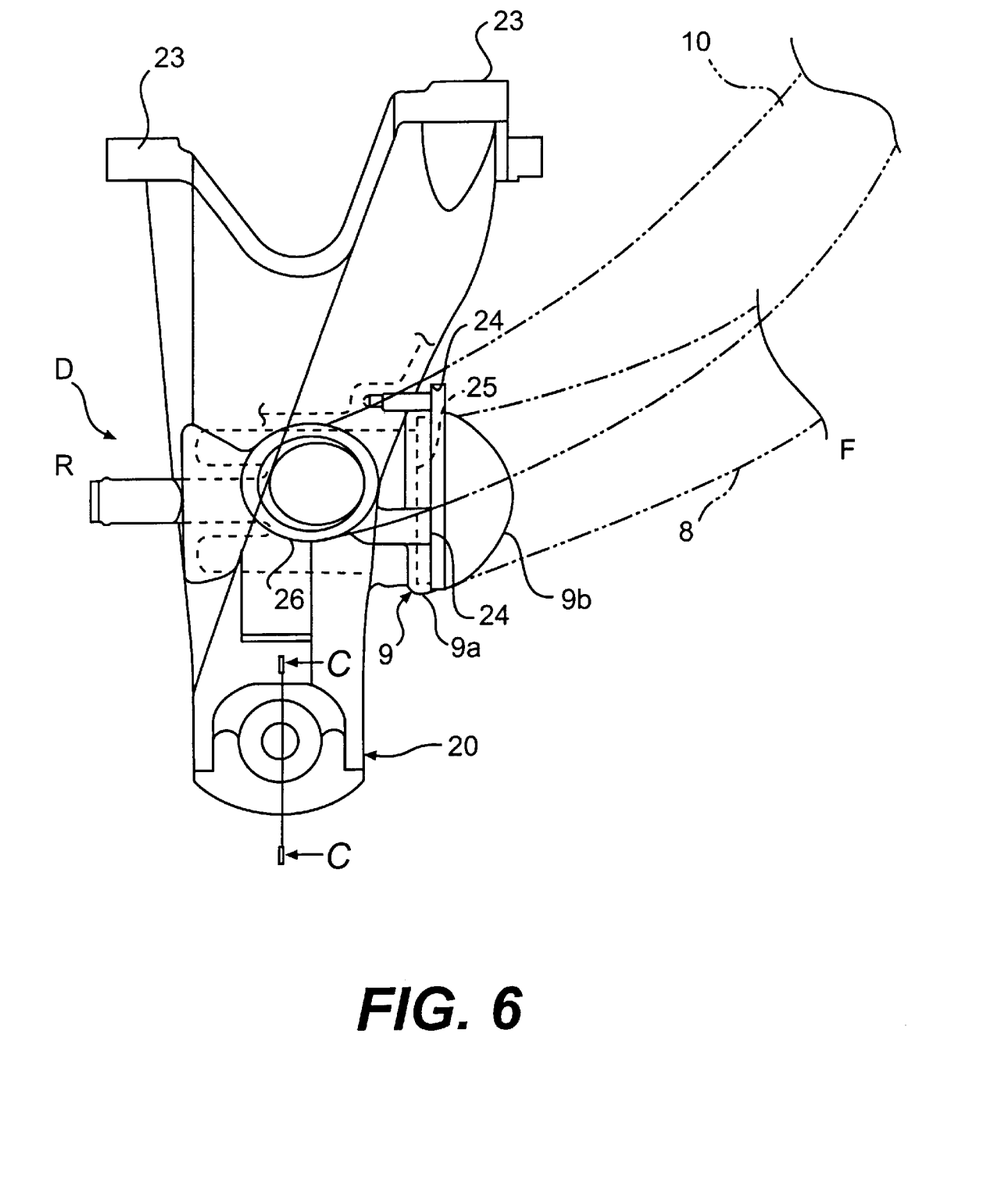
FIG. 6 is an enlarged plan view of a portion of the mounting bracket of FIG. 1.
Figure 7:
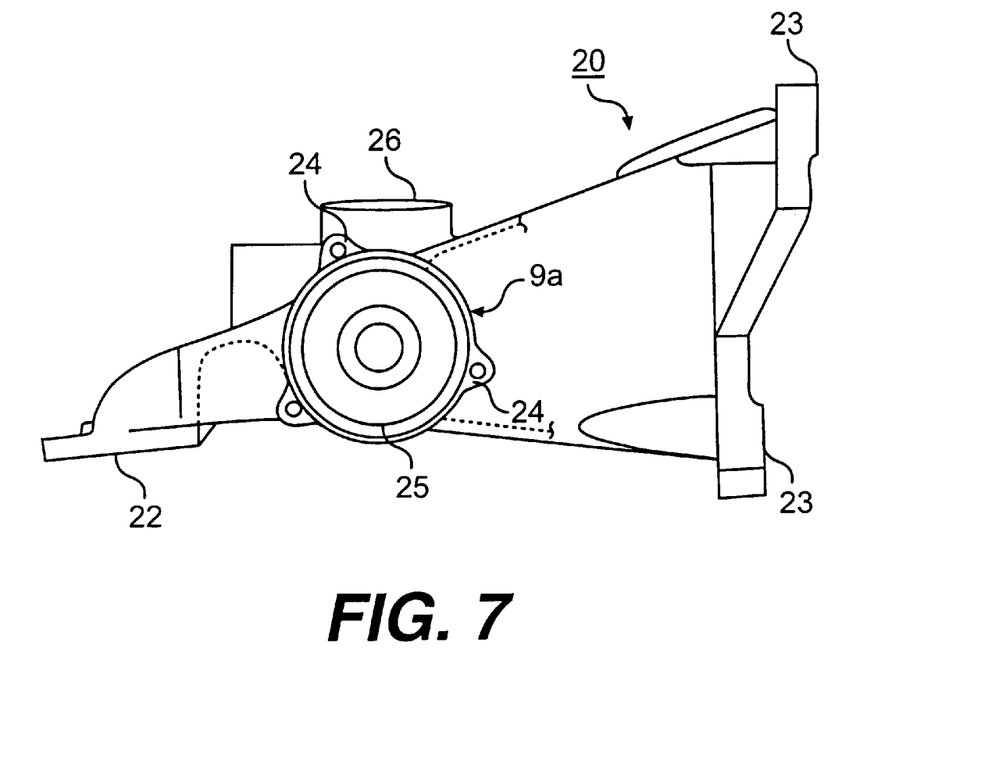
FIG. 7 is a view from F-side of what is shown in FIG. 6.
Figure 8:
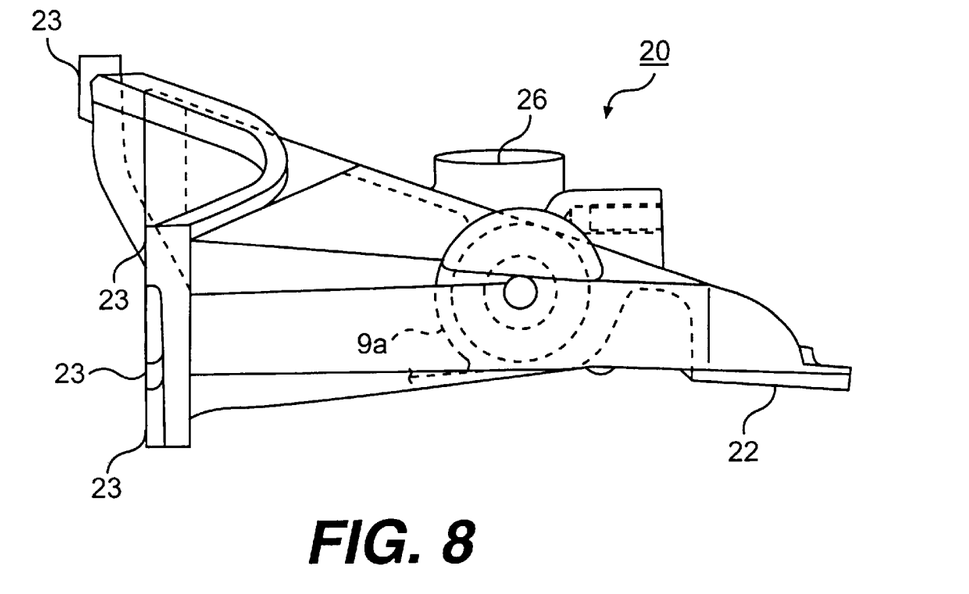
FIG. 8 is a view from R-side of what is shown in FIG. 6.

Here, the configuration of the mounting bracket 20 which is provided with the thermo-case 9 in a unit is explained in detail based on FIGS. 6–9. FIG. 6 is an enlarged plan view of the mounting bracket 20 in FIG. 1. The mounting bracket 20 is, as shown in FIGS. 7 and 8, on side view (viewing from either front or rear), formed approximately as a right-angled triangle shape and mounted on the internal combustion engine body 2 in such a manner as the smallest angle portion thereof is directed toward in the left and right direction of the vehicle.

Figure 10:
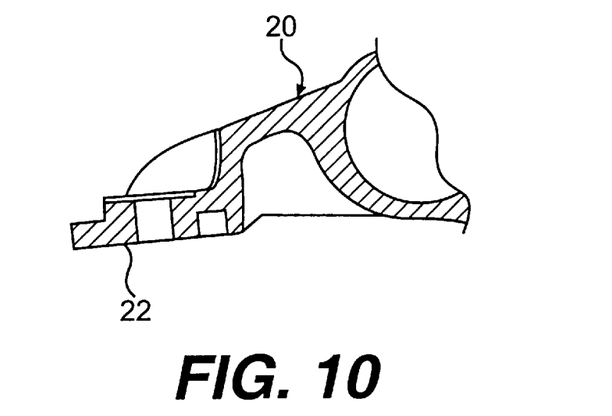
FIG. 10 is a sectional view along with C—C line of FIG. 6.
Figure 11:
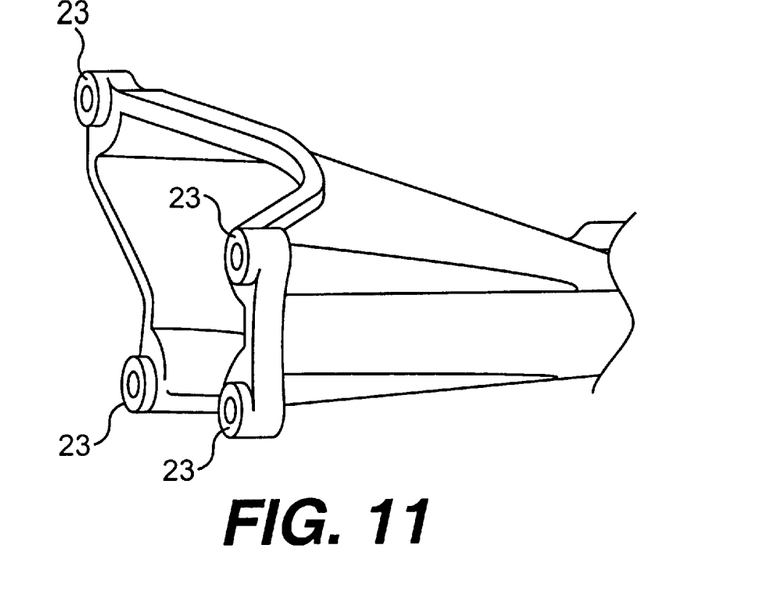
FIG. 11 shows a portion pointed by an arrow D in FIG. 6.
Figure 12:
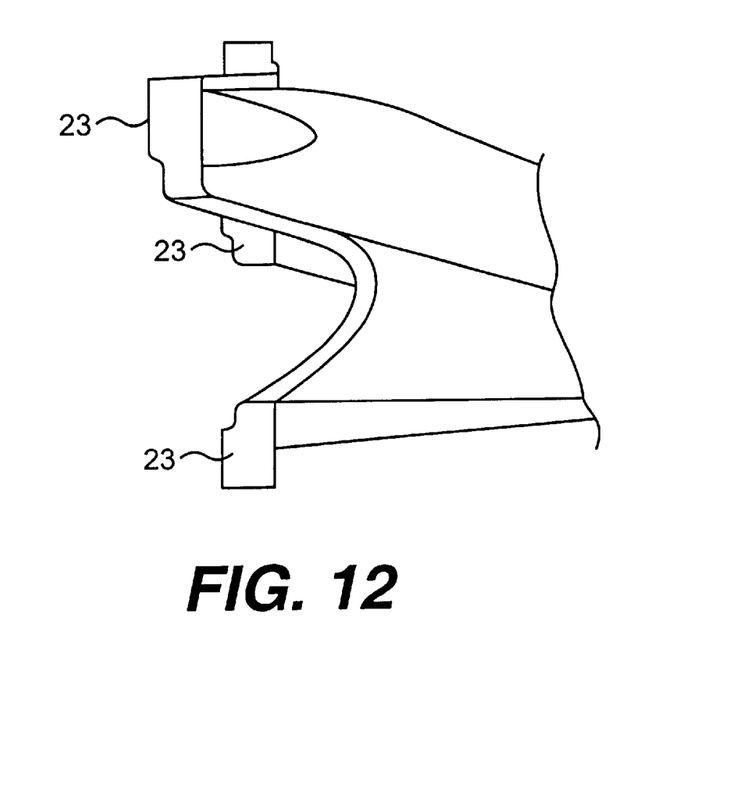
FIG. 12 shows a partially enlarged plan view of the cylinder block mounting face shown in FIG. 11.

Accordingly, the bottom end of the side-directed portion becomes a vehicle mounting face 22 (see also FIG. 10), and the vertical side at the right angle side becomes the cylinder block mounting face 23 for the internal combustion engine body 2 (see also FIGS. 11 and 12). This mounting face 23 is provided at four positions. For reference, the vehicle mounting face 22 is mounted on the vehicle through a mount (not shown).

Figure 9:
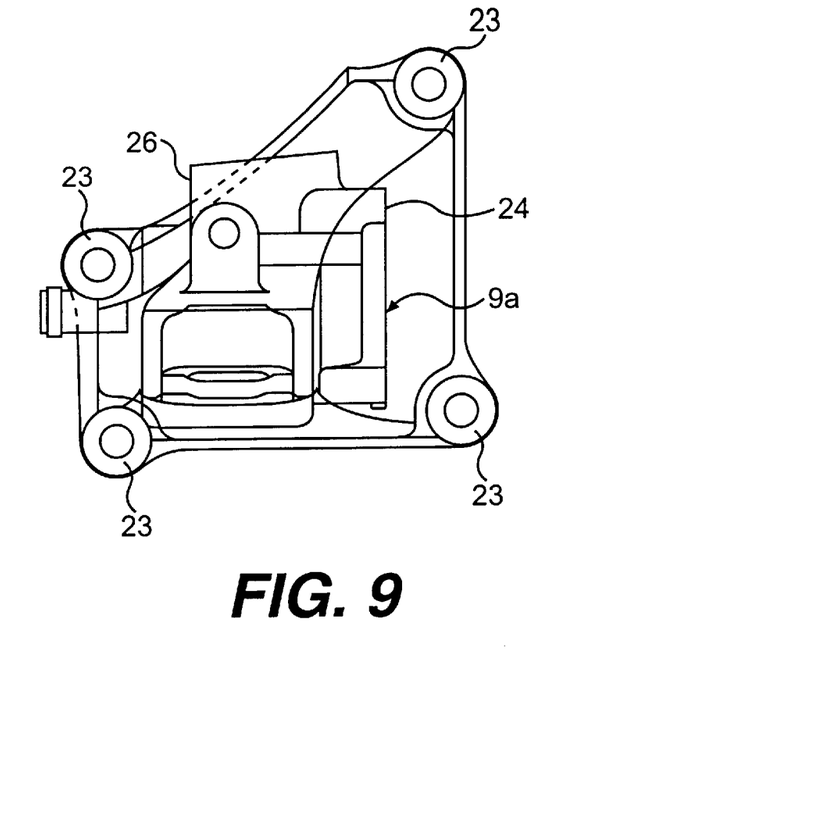
FIG. 9 is a front view of what is shown in FIG. 6.

Further, as shown in FIGS. 6–8, at approximate center portion of the mounting bracket 20, the case body 9a which forms the thermo-case 9 is mounted in a unit. At the front side of the vehicle in the case body 9a, as shown in FIGS. 6, 7 and 9, a thermo-cap mounting face 24 for mounting the thermo-cap 9b is formed. Further, inside the thermo-case body 9a, shown in FIGS. 6 and 7, a thermostat mounting face 25 for mounting the thermostat 11 is formed.

The thermo-cap 9b to be connected to the thermo-cap mounting face 24 and the radiator 7 are connected, as described above, with the cooling water piping 8. Further, in FIGS. 6–9, the case body 9a of the thermo-case 9 is provided with a piping connection portion 26 with an opening thereof directing upward. This piping connection portion 26 is connected, as mentioned above, with the other end of the cooling water piping 10, one end of which is connected to the water pump 3.

Next, the function of this embodiment is explained. As mentioned above, since, on the mounting bracket 20 for holding the internal combustion engine 1 on the vehicle, the case body 9a side of the thermo-case 9 is mounted in a unit, on this case body 9a, the thermostat 11 is mounted, and on the case body 9a, the thermo-cap 9b is installed, the mounting position of the thermo-case 9 can be made lower in the internal combustion engine 1.

Thereby, the length of the cooling water piping 8 in communication with the thermo-cap 9b of the thermo-case 9 and the radiator 7 and the length of the cooling water piping 10 in communication with the case body 9a of the thermo-case 9 and the water pump 3 can be made short. Further, since the thermo-case 9 is mounted lower, the thermo-case 9 is easy to receive the wind at the time of driving.

Further, since the cooling water piping 8 making the thermo-cap 9b and the radiator 7a in communication with each other and the cooling water piping 10 making the case body 9a and the water pump 3 in communication with each other are made to be separated from the internal combustion engine body 2 and are disposed at the side opposite to the side of the internal combustion engine 1 where an exhaust manifold 17 is provided, the cooling water pipings 8 and 10 become hard to be heated from the internal combustion engine body 2.

In addition, since the angle which is formed with the center line T of the thermostat 11 and the horizontal axis A in the axial direction of the internal combustion engine itself is made in accordance with the angle θ which is formed with the horizontal axis B at the time when the internal combustion engine 1 is mounted on the vehicle and the horizontal axis A in the axial direction of the internal combustion engine itself, and the thermo-case 9 is mounted on the mounting bracket 20, when the internal combustion engine 1 is actually mounted on the vehicle, the center line T of the thermostat 11 is adapted to be in accordance with the horizontal axis B in case the internal combustion engine 1 is mounted on the vehicle to become horizontal and the thermo-cap 9b and the case body 9a are located at the same level. Thereby, no air standing is generated in the thermo-cap 9b. The above mounting bracket 20 provided in a unit with the thermo-case 9 can be realized to be carried out regardless of the mounting direction (lengthwise-setting or crosswise-setting) of the internal combustion engine 1 on the vehicle.

According to the first feature of the present invention, since the mounting bracket, which is provided in the internal combustion engine body, is provided in a unit with the thermo-case which is installed in the thermostat to be provided in the cooling water channel, the mounting position of the thermo-case can be set lower. Thus, since the mounting position is set lower, the length of the cooling water piping which communicates the thermo-case to the radiator and the length of the cooling water piping which communicates the thermo-case to the water pump can be made shorter than the conventional manner. Thereby, it can be realized to reduce the weight of the internal combustion engine. Further, since the mounting position of the thermo-case becomes low, no air standing may be generated in the thermo-case and reduce the deterioration of the internal combustion engine at the time of lack of the cooling water.

In addition, due to the unification of the mounting bracket and the thermo-case, the number of the part of the internal combustion engine (for example, the number of bolt) can be reduced and attachment such as boss portion for clamping and the machining such as tapping can be reduced. Thereby, an assembling time of the internal combustion engine may be shortened and a cost may become low.

Further, according to the second feature of the present invention, since the thermo-case is mounted on the mounting bracket of the internal combustion engine in such a manner as the angle which is formed with the center line of the thermostat provided coaxially with the thermo-case and the horizontal axis in the axial direction of the internal combustion engine itself becomes greater than the angle which is formed with the horizontal axis in case the internal combustion engine is mounted on the vehicle and the horizontal axis in the axial direction of the internal combustion engine itself, when the internal combustion engine is mounted on the vehicle, the center line of the thermostat becomes approximately horizontal or the lower tank side of the radiator of the thermo-case becomes lower than horizontal, through which too, the generation of the air standing in the thermo-case is avoided and the deterioration of the internal combustion engine at the time of lack of the cooling water can be reduced.

Further, according to the third feature of the present invention, since the cooling water piping connecting the radiator and the thermo-case and the cooling water piping connecting the thermo-case and the water pump are disposed respectively apart from the internal combustion engine body, each cooling water piping is not heated by the internal combustion engine, thereby, the cooling efficiency may be increased.

Further, according to the fourth feature of the present invention, since the cooling water piping connecting the radiator and the thermo-case and the cooling water piping connecting thermo-case and the water pump are disposed respectively at the side opposite to the side of the internal combustion engine where the exhaust manifold is provided, each cooling water piping is not heated by the exhaust manifold, thereby too, the cooling efficiency may be increased.

What is claimed is:

1. In a cooling apparatus for an internal combustion engine, wherein a cooling water circuit is formed by connecting a cooling water channel provided in an internal combustion engine body and a radiator for cooling the cooling water heated in the internal combustion engine body with a cooling water piping and a water pump for circulating the cooling water in the circuit is provided, said apparatus is characterized in that a mounting bracket for mounting an internal combustion engine on a vehicle is provided on the internal combustion engine body and a thermostat installed in a thermo-case to be provided in the cooling water circuit is provided in a unit on the mounting bracket.

2. A cooling apparatus according to claim 1, wherein the thermo-case is mounted on the internal combustion engine in such a manner as an angle which is formed with a center line of the thermostat provided coaxially with the thermo-case and a horizontal axis in an axial direction of the internal combustion engine body becomes greater than an angle which is formed with a horizontal axis in an axial direction of the internal combustion engine which is mounted on the vehicle and the horizontal axis in the axial direction of the internal combustion engine itself.

3. A cooling apparatus according to claim 1, wherein a cooling water piping connecting the radiator and the thermo-case and a cooling water piping connecting the thermo-case and the water pump are disposed apart from the internal combustion engine body.

4. A cooling apparatus according to claim 1, wherein the cooling water piping connecting the radiator and the thermo-case and the cooling water piping connecting the thermo-case and the water pump are disposed at the side opposite to the side of the internal combustion engine where an exhaust manifold is provided.

5. A cooling apparatus according to claim 2, wherein a cooling water piping connecting the radiator and the thermo-case and a cooling water piping connecting the thermo-case and the water pump are disposed apart from the internal combustion engine body.

* * * * *